(12) United States Patent
Martínez Mardones

(10) Patent No.: US 12,378,941 B2
(45) Date of Patent: Aug. 5, 2025

(54) SYSTEM FOR POWER GENERATION USING OCEAN WAVES

(71) Applicant: Jorge Alfonso Martínez Mardones, Santiago (CL)

(72) Inventor: Jorge Alfonso Martínez Mardones, Santiago (CL)

( * ) Notice: Subject to any disclaimer, the term of this patent is extended or adjusted under 35 U.S.C. 154(b) by 62 days.

(21) Appl. No.: 18/208,514

(22) Filed: Jun. 12, 2023

(65) Prior Publication Data

US 2023/0400004 A1    Dec. 14, 2023

(30) Foreign Application Priority Data

Jun. 14, 2022    (CL) .................................. 202201596

(51) Int. Cl.
     *F03B 13/00*      (2006.01)
     *F03B 3/12*      (2006.01)
     *F03B 13/14*      (2006.01)

(52) U.S. Cl.
     CPC .............. *F03B 13/14* (2013.01); *F03B 3/121* (2013.01); *F05B 2220/706* (2013.01)

(58) Field of Classification Search
     CPC ........ F03B 13/14; F03B 3/121; F03B 13/187; F05B 2220/706; Y02E 10/30
See application file for complete search history.

(56) References Cited

U.S. PATENT DOCUMENTS 4,207,741 A * 6/1980 Rainey .................... F04B 9/113
                                                                                                60/497

4,208,878 A * 6/1980 Rainey .................. F03B 13/262
                                                                                                60/398

(Continued)

FOREIGN PATENT DOCUMENTS

| CL | 200400333 A1 | 2/2004 |
|----|--------------|--------|
| CN | 105715447 A  | 6/2016 |
| ES | 2897126 A1   | 2/2022 |

*Primary Examiner* — Julio C. Gonzalez
(74) *Attorney, Agent, or Firm* — Procopio, Cory, Hargreaves & Savitch LLP

(57) ABSTRACT

The present invention relates to technologies or applications for the mitigation or adaptation to climate change, specifically to the generation of energy through renewable energy sources. In particular, the present invention provides a system for the continuous generation of renewable energy by harnessing ocean waves characterized in that it comprises: a first floating element positioned on the waves and operatively connected to a vertical assembly; a swing arm positioned on a fixed base and operatively connected at one end to said vertical assembly, and at the opposite end to a pair of pneumatic cylinders, wherein the movement of said swing arm alternately actuates each of the pneumatic cylinders comprising said pair of pneumatic cylinders; an air storage tank operatively connected to said pair of pneumatic cylinders; a turbine which is fed from said air storage tank, and which is operatively connected through its shaft to an electrical generator; an electrical substation operatively connected to said electrical generator, wherein said electrical substation is configured to store, manage and distribute the energy produced in said electrical generator; and a control system operatively connected to: said pair of pneumatic cylinders, said air storage tank, said turbine, said electrical generator, and said electrical substation; wherein said control system is configured to monitor and control each of the aforementioned.

17 Claims, 3 Drawing Sheets

(56) References Cited

U.S. PATENT DOCUMENTS

| | | | | |
|---|---|---|---|---|
| 4,281,257 A * | 7/1981 | Testa | F03B 13/24 |
| | | | 417/343 |
| 4,454,429 A * | 6/1984 | Buonome | F03B 13/18 |
| | | | 60/495 |
| 4,931,662 A * | 6/1990 | Burton | F03B 13/1815 |
| | | | 60/507 |
| 8,540,489 B2 * | 9/2013 | Bouvet | F03B 1/02 |
| | | | 416/207 |
| 2011/0311363 A1 * | 12/2011 | Bills | F03D 1/0633 |
| | | | 416/176 |
| 2012/0248865 A1 * | 10/2012 | Eder | F03B 13/16 |
| | | | 307/9.1 |
| 2014/0097617 A1 | 4/2014 | Rohrer | |

* cited by examiner

SYSTEM FOR POWER GENERATION USING OCEAN WAVES

TECHNICAL FIELD OF THE INVENTION

The present invention relates to technologies or applications for the mitigation or adaptation to climate change, specifically to the generation of energy through renewable energy sources. In particular, the present invention provides a system for the continuous generation of renewable energy by harnessing ocean waves.

BACKGROUND OF THE INVENTION

Wave energy, or wave power, is defined as the mechanical energy generated by the movement of ocean waves, which can be harnessed and transformed for any required use. Wave energy is a renewable resource having a great potential in Chile.

In the state of the art, there are several solutions for wave energy, with different methods of approaching the harnessing of this resource, some of which are well developed, including industrial prototypes operating in maritime conditions and others in the commercialization stage. For example, document ES2897126 describes a system for the generation of electrical and mechanical energy from wave energy, characterized in that it comprises a converter module composed of the following elements: a buoy; a stability chamber anchored to the seabed; a bar that converts wave energy into electrical and mechanical energy. All these elements are configured in such a way that the buoy, which moves vertically and alternately following the wave profile, creates a flow of mechanical energy that drags, with a linear movement, an assembly formed by the oscillator of a linear electric generator and the piston of a high-pressure mechanical, alternating, double-acting pump. Both the linear electric generator and the high-pressure pump are located inside said converter bar, maintained in a vertical position, inside the water column, supported by the stability chamber.

On the other hand, document US2014097617 provides a wave energy converter device comprising: a float having a wave impacting forward face and a base wherein the face is oriented substantially parallel to oncoming wave fronts, and wherein the horizontal width of the face, alone or in combination with adjacent float faces, is greater than the front of the same; a controllable submerged-depth, buoyant frame movably secured to said float, wherein said frame is configured such that the submerged depth of the frame can partially or fully submerge said float, and wherein said frame is partially stabilized against wave or any additional mass entrained therein; a mechanical linkage movably securing and defining the orientation and axis of motion of said float to the frame, wherein said linkage may be lever or swing arms, sliders, linear bearings, among others; a device anchor attached to said frame at one or more points, directly or indirectly, wherein the device anchor may be, buoys, pilings, towers, among others; a power take-off apparatus secured to, or within, said frame or said float and configured to be actuated by a force generated by the relative motion between the float and frame.

However, in the aforementioned documents there are difficulties, such as, for example, irregular harnessing of energy, given the intermittency of the waves; low density and low energy efficiency, resulting in high operating and maintenance costs.

Consequently, a system is required for the continuous generation of renewable energy that can mitigate the intermittency produced by the swaying of the waves, i.e., achieving increased effectiveness in its capture; in addition to achieve greater efficiency in the transfer of the mechanical energy of the swaying to the electrical energy produced. Using these capacities, it will be possible to reduce the investment costs of the generation system, as well as the operation and maintenance costs.

SUMMARY OF THE INVENTION

The present invention provides a system for the continuous generation of renewable energy by harnessing ocean waves, characterized in that it comprises: a first floating element positioned on the waves and operatively connected to a vertical assembly; a swing arm positioned on a fixed base and operatively connected at one end to said vertical assembly, and at the opposite end to a pair of pneumatic cylinders, wherein the movement of said swing arm alternately actuates each of the pneumatic cylinders comprising said pair of pneumatic cylinders; an air storage tank operatively connected to said pair of pneumatic cylinders; a turbine which is fed from said air storage tank, and which is operatively connected through its shaft to an electrical generator; an electrical substation operatively connected to said electrical generator, wherein said electrical substation is configured to store, manage and distribute the energy produced in said electrical generator; and a control system operatively connected to: said pair of pneumatic cylinders, said air storage tank, said turbine, said electrical generator, and said electrical substation; wherein said control system is configured to monitor and control each of the aforementioned.

In a preferred embodiment, the system for the continuous generation of renewable energy by harnessing ocean waves is characterized in that said first floating element is a buoy.

In another preferred embodiment, the system for the continuous generation of renewable energy by harnessing ocean waves is characterized in that said first floating element is positioned in an enclosed space connected to the waves through a conveyance channel.

In another preferred embodiment, the system for the continuous generation of renewable energy by harnessing ocean waves is characterized in that said vertical assembly allows only upward and downward movement of said floating element.

In a further preferred embodiment, the system for the continuous generation of renewable energy by harnessing ocean waves is characterized in that said swing arm is anchored to the ground through a fixed base and is pivotally connected thereto.

In another preferred embodiment, the system for the continuous generation of renewable energy by harnessing ocean waves is characterized in that each of the pneumatic cylinders comprising said pair of pneumatic cylinders comprises a movable base.

In another preferred embodiment, the system for the continuous generation of renewable energy by harnessing ocean waves is characterized in that said pair of pneumatic cylinders and said storage tank are connected through a compressed air system.

In a further preferred embodiment, the system for the continuous generation of renewable energy by harnessing ocean waves is characterized in that said air storage tank comprises air regulation means.

In another preferred embodiment, the system for the continuous generation of renewable energy by harnessing ocean waves is characterized in that said turbine is actuated by aerodynamic thrust.

In another preferred embodiment, the system for the continuous generation of renewable energy by harnessing ocean waves is characterized in that said turbine comprises a series of semi-closed blades comprising a rotor.

In a further preferred embodiment, the system for the continuous generation of renewable energy by harnessing ocean waves is characterized in that said series of semi-closed blades are shaped like an upward spiral forming an inverted cone.

In another preferred embodiment, the system for the continuous generation of renewable energy by harnessing ocean waves is characterized in that said turbine comprises a series of spoon-shaped blades connected to a rotor.

In another preferred embodiment, the system for the continuous generation of renewable energy by harnessing ocean waves is characterized in that said turbine is immersed in a fluid reservoir.

In a further preferred embodiment, the system for the continuous generation of renewable energy by harnessing ocean waves is characterized in that air stored in said air storage tank enters the turbine through an air injection duct.

In another preferred embodiment, the system for the continuous generation of renewable energy by harnessing ocean waves is characterized in that said air injection duct comprises air injection means positioned in a lower portion of said turbine.

In another preferred embodiment, the system for the continuous generation of renewable energy by harnessing ocean waves is characterized in that said air injection means are positioned opposite said rotor.

In a further preferred embodiment, the system for the continuous generation of renewable energy by harnessing ocean waves is characterized in that said control system additionally comprises a plurality of sensors and valves connected throughout the system.

In another preferred embodiment, the system for the continuous generation of renewable energy by harnessing ocean waves is characterized in that said control system is satellite-connected to a second floating element positioned on the waves.

DETAILED DESCRIPTION OF THE INVENTION

Figure 1:
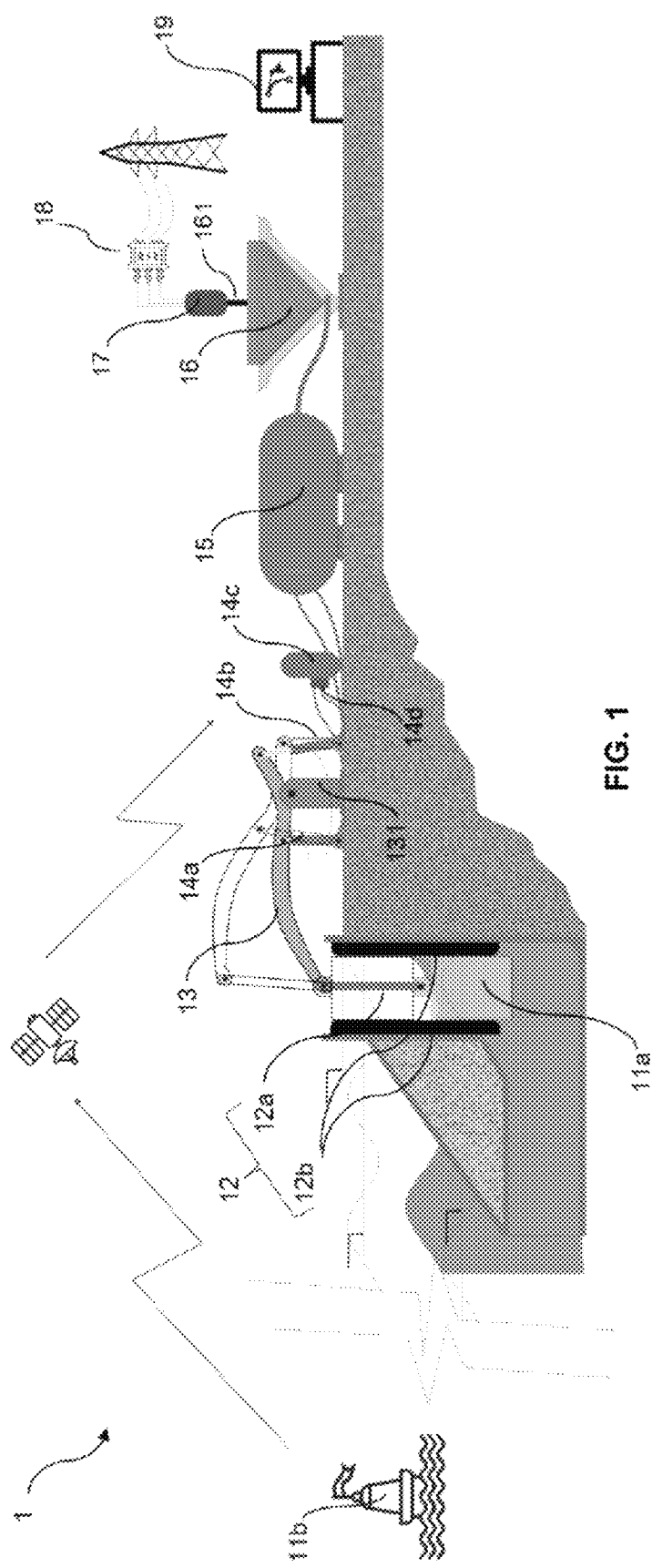
FIG. 1 illustrates a full schematic view of a first embodiment of the system (1) for the continuous generation of renewable energy by harnessing ocean waves that is the subject matter of the present invention.

Essentially, the present invention provides a system (1) for the continuous generation of renewable energy by harnessing ocean waves comprising:
 a first floating element (11a) positioned on the waves and operatively connected to a vertical assembly (12a);
 a swing arm (13) positioned on a fixed base (131) and operatively connected at one end to said vertical assembly (12a), and at the opposite end to a pair of pneumatic cylinders (14a, 14b); wherein the movement of said swing arm (13) alternately actuates each of the pneumatic cylinders (14) comprising said pair of pneumatic cylinders (14a, 14b);
 an air storage tank (15) operatively connected to said pair of pneumatic cylinders (14a, 14b);
 a turbine (16) which is fed from said air storage tank (15), and which is operatively connected through its shaft (161) to an electric generator (17);
 an electrical substation (18) operatively connected to said electrical generator (17), wherein said electrical substation (18) is configured to store, manage and distribute the energy produced in said electrical generator (17); and
 a control system (19) operatively connected to: said pair of pneumatic cylinders (14a, 14b), said air storage tank (15), said turbine (16), said electrical generator (17), and said electrical substation (18); wherein said control system (19) is configured to monitor and control each of the aforementioned.

It is important to emphasize that the dimensions of each of the parts forming the system (1) for the continuous generation of renewable energy by harnessing ocean waves do not limit in any way the scope of the present invention. In that sense, values corresponding to the approximate dimensions will be indicated throughout the text, not being these values unique and exclusive, and which may increase or decrease depending on the requirements of the system.

In the context of the present invention, and without limiting the scope of the same, a floating element should be understood as an object or thing that is naturally supported on the surface of a liquid. However, it may be submerged by the action of external forces, as shown in FIG. 1.

The geometry, material, and dimensions of the first floating element (11a) do not limit the scope of the present invention. In a preferred embodiment, and without limiting the scope of protection, said first floating element (11a) is substantially cylindrical in shape, composed of a polymeric or metallic material, with a height of 200 cm and a diameter of 100 cm. In a still more preferred embodiment, said first floating element (11a) is a buoy or pontoon.

In the context of the present invention, and without limiting the scope of the same, a vertical assembly should be understood as a series of elements or parts interconnected with each other, and which limit the movement of the first floating element (11a) solely and exclusively vertically.

The vertical assembly (12) is fixedly coupled to the first floating element (11a), so as to transmit the force of the swing arm (13) and generate the movement of said first floating element (11a). The parts and quantity of parts of said vertical assembly (12) do not represent a limiting feature for the present invention. In a preferred embodiment, and without limiting the scope of protection, said vertical assembly (12) comprises a straight segment (12a) fixedly connected to the upper portion of said first floating element (11a) and a set of guides consisting of rigid metallic or polymeric beams (12b) coated with sliding material positioned on the lateral sides of the conveyance channel where the floating element (11a) is mobilized, as shown in FIG. 1. In a highly advantageous embodiment, the spacing between each of the beams (12b) coincides with the width of said first floating element (11a), so that it is positioned closely within the beams, preventing and cancelling the horizontal movement that could be created by external forces, mainly waves, and allowing its back-and-forth movement within the beams.

In a preferred embodiment, and without limiting the scope of protection, said vertical assembly (12), by the action of said rigid segment (12a) and said guide beams (12b), allows only the upward and downward movement of said floating element (11a). Moreover, the material and dimensions of said straight segment and said pair of rigid walls do not limit the scope of the present invention. In a preferred embodiment, and without limiting the scope of protection, said straight segment is a steel tube having a length of 175 cm, a diameter of 15 cm and a thickness of 1.2 cm.

In the context of the present invention, and without this limiting the scope of the same, a conveyance channel should be understood as a construction or work that is done on the edge of the sea, and which aims to create a segmentation of the same. Its objective is to maintain the connection and sea level, eliminating the breaking of the waves on the floating element (11a), but allowing the connection of the walls containing the vertical assembly (12). In a preferred embodiment, and without limiting the scope of protection, the first floating element (11a) is positioned in an enclosed space connected to the waves through a conveyance channel, as shown in FIG. 1.

In the context of the present invention, and without limiting the scope of the same, a swing arm should be understood as an articulated mechanism that moves or tilts on a shaft, generating an alternative rocking movement.

The swing arm (13) is made of a substantially rigid material, since it must be capable of transmitting the movement bidirectionally; at one end to the first floating element (11a), and at the opposite end to each of the cylinders comprising said pair of pneumatic cylinders (14a, 14b). The same can be formed in a single piece or by means of the articulation of several pieces, this characteristic not limiting the scope of the present invention, as shown in FIG. 1. Likewise, the material and dimensions of said swing arm (13) also do not limit the scope of the present invention. In a preferred embodiment, and without limiting the scope of protection, said swing arm (13) is made of steel, having a length of 410 cm, a width of 40 cm, and a thickness of 5 cm. Additionally, said swing arm (13) is installed on a base which is positioned above ground level, said base must remain fixedly anchored to the ground. The shaft with respect to which said swing arm (13) rotates is also located on said base, as shown in FIG. 1.

Figure 2:
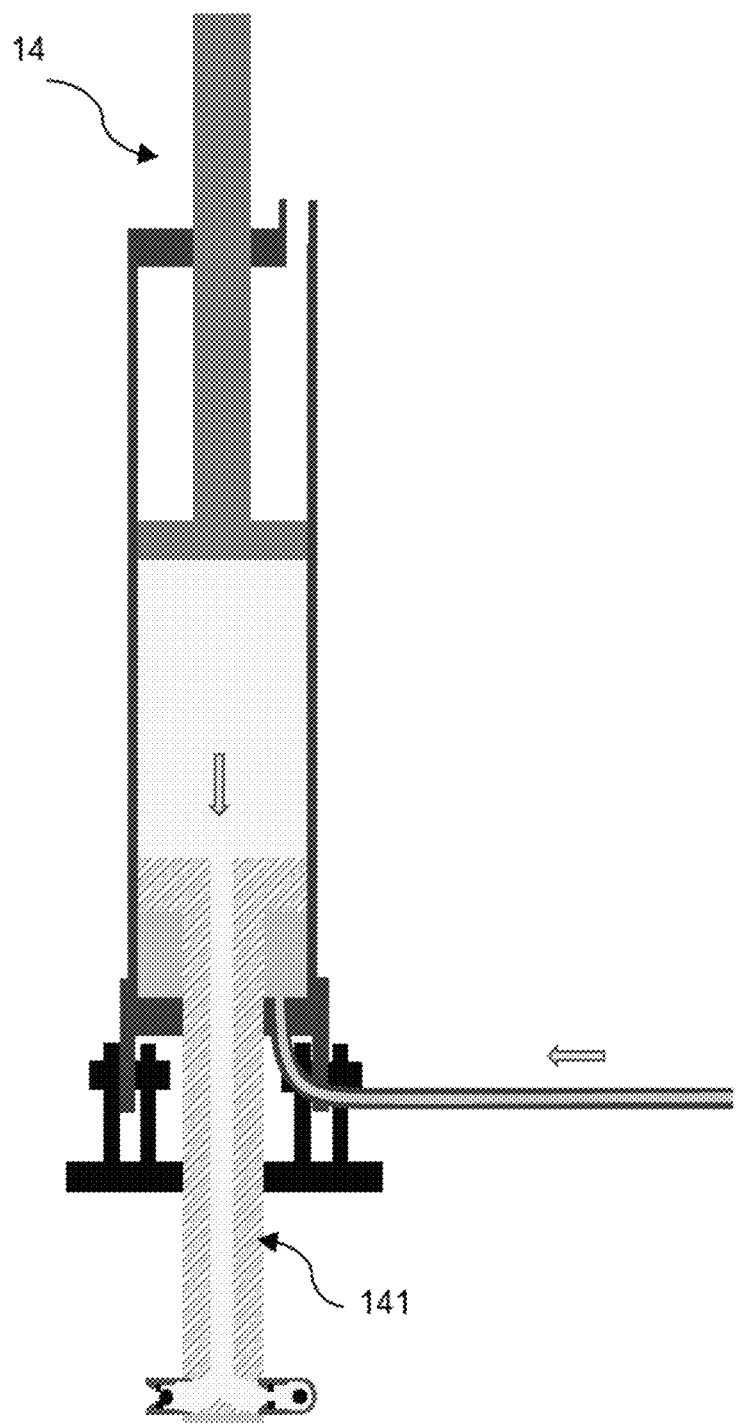
FIG. 2 illustrates a main view of a first embodiment of one of the pneumatic cylinders (14) with movable base (141), which is part of the system (1) for the continuous generation of renewable energy by harnessing ocean waves that is the subject matter of the present invention.

Each of the pneumatic cylinders (14a, 14b) are positioned, respectively, next to both sides of said base supporting the swing arm (13). The actuation of each of the pneumatic cylinders (14) is generated by the alternating movement of said swing arm (13), as shown in FIG. 1. The technical specifications of each of the cylinders comprising said pair of pneumatic cylinders (14a, 14b) do not limit the scope of the present invention. In a highly advantageous preferred embodiment, each of the pneumatic cylinders comprising said pair of pneumatic cylinders (14a, 14b) comprises a movable base (141), as shown in FIG. 2. This movable base (141) moves depending on the amplitude and tide of the waves, such that it is adjusted according to the compressed air requirements of the air storage tank (15), the tide and the amplitude of the waves. The movement of the movable base (141) of each of the pneumatic cylinders (14a, 14b), as well as that of said air storage tank (15), does not limit the scope of the present invention. In a preferred embodiment, and without limiting the scope of protection, the movement of each of the pneumatic cylinders (14a, 14b) and the actuation of said air storage tank (15) are activated through an oleo-hydraulic system. The components forming said oleo-hydraulic system do not represent a limiting feature for the present invention. In a preferred embodiment, and without limiting the scope of protection, said system comprises an oleo-hydraulic circuit actuated by an oil pump (14d) connected through a pipe to the pneumatic cylinders (14a and 14b) on one side and to an oil regulating reservoir (14c) on the other, which injects or withdraws oil from the base of the pneumatic cylinders, thus making the movable base (141) go up or down inside the cylinders and adjusting the piston stroke of the pneumatic cylinder (14a and 14b) according to the requirements of the waves and the tide. This adjustment is made by means of the control system (19) which receives the information from the floating element (11b).

In the context of the present invention, and without limiting the scope of the same, an oleo-hydraulic system should be understood as a system for the transmission of forces and movements, which operates on the basis of mineral oils or other fluid having certain appropriate characteristics, mainly oils derived from petroleum.

The air storage tank (15), which is linearly connected to each of said pair of pneumatic cylinders (14a, 14b), is also fed by the air generated by the cylinders. The shape, material, and capacity of said air storage tank (15) does not limit the scope of the present invention. In a preferred embodiment, and without limiting the scope of protection, said air storage tank (15) is a carbon steel capsule having a capacity of 3,500 liters. In another preferred embodiment, and without limiting the scope of protection, the air storage tank (15) comprises air regulation means. In a still more preferred embodiment, said air regulation means of said air storage tank (15) are regulating valves operated by electric or electro-pneumatic actuation, and are actuated by means of the control system (19).

Figure 3:
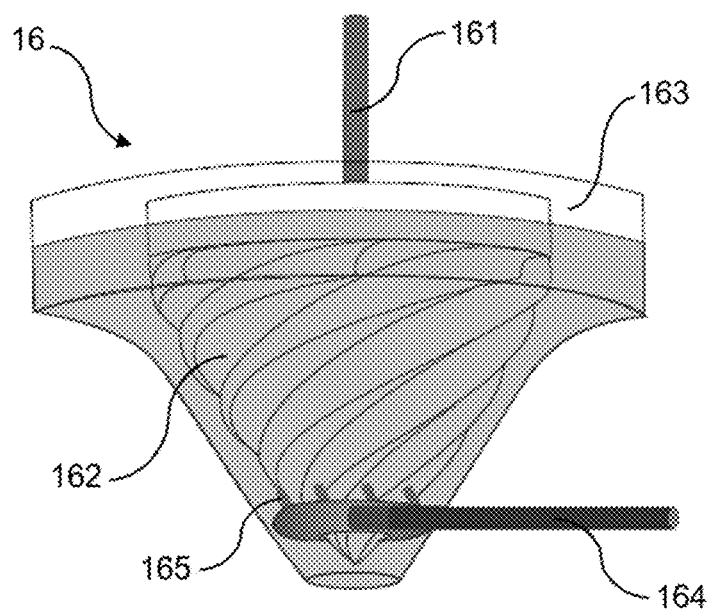
FIG. 3 illustrates a main view of a first embodiment of the turbine (16) actuated by hydro-pneumatic thrust, which is part of the system (1) for the continuous generation of renewable energy by harnessing ocean waves that is the subject matter of the present invention.
Figure 4:
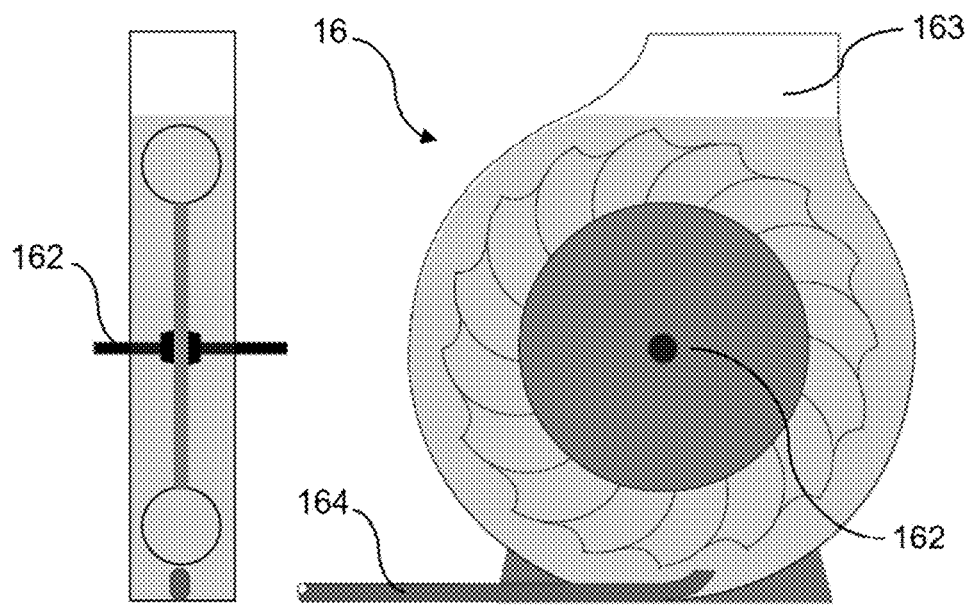
FIG. 4 illustrates a main view and a side view of an alternative embodiment of the turbine (16) actuated by hydro-pneumatic thrust, which is part of the system (1) for the continuous generation of renewable energy by harnessing ocean waves that is the subject matter of the present invention.

Next, and connected in series to said air storage tank (15), a turbine (16) is positioned which, in turn, is operatively connected through its shaft (161) to an electric generator (17), and as shown in FIG. 1. In a preferred embodiment, and without limiting the scope of protection, said turbine (16) is actuated by aerodynamic thrust. The geometry and capacity of said turbine (16) does not limit the scope of the present invention. In a preferred embodiment, and without limiting the scope of protection, said turbine (16) comprises a series of semi-closed blades in the form of an upward spiral, which when joined together form an inverted cone comprising the rotor (162), as shown in FIG. 3. In another preferred embodiment, which is an alternative to the above-mentioned, and without limiting the scope of protection, said turbine (16) comprises a series of spoon-shaped blades connected to a rotor (162), as shown in FIG. 4. Said rotor (162) is immersed in a fluid, as shown in FIG. 3 and FIG. 4. In a preferred embodiment, and without limiting the scope of protection, said fluid is water, which is contained in a fluid reservoir (163), such that compressed air from the air storage tank (15) enters said turbine (16) through an air injection duct (164), as shown in FIG. 3 and FIG. 4. In another preferred embodiment, and without limiting the scope of protection, said air injection duct (164) comprises air injection means (165) positioned in a lower portion of said turbine (16). In a still more preferred realization, which is particularly advantageous, said air injection means (165) are positioned facing said rotor (162), as shown in FIG. 3.

In another preferred embodiment, and without limiting the scope of protection, the air intake is by means of a manifold, and said air injection duct (164) is in the form of a toroidal tube surrounding the entire section of the turbine (16).

This configuration allows, as the air rises in the form of bubbles inside the blades, to generate a rotation of the rotor (162) as a result of its design, flow and thrust. This has repercussions on the rotation of the shaft (161) which is connected to said electric generator (17). The characteristics and specifications of the electric generator (17) which is connected to the turbine (16) through its shaft (161) do not limit the scope of the present invention. In a preferred embodiment, and without limiting the scope of protection, said electric generator (17) is a 600 kVA and 50 Hz generator.

In the context of the present invention, and without limiting the scope of the same, an electrical substation shall be understood as a facility intended to establish voltage levels suitable for the transmission and distribution of the electrical energy generated by the electrical generator (17).

The electrical generator (17) is linearly and operatively connected to an electrical substation (18), as shown in FIG. 1, configured to store, manage, and distribute the energy produced in said electrical generator (17). The components and specifications of the components comprising said electrical substation (18) do not limit the scope of the present invention. In a preferred embodiment, and without limiting the scope of protection, said electrical substation (18) may additionally comprise a transformer, disconnectors, busbars, switchgear, lightning arresters, point of connection to the high-voltage line for power supply and control room, among other elements. All these elements are part of a typical electrical substation, which basically raises the generated voltage from medium to high or very high in order to transport it. The primary voltage of the transformers may be between 3 and 36 kV. The secondary voltage of the transformers will be conditioned by the voltage of the transmission or interconnection line (66, 110, 220 or 380 kV), which will be defined for each project.

In the context of the present invention, and without limiting the scope of the same, a control system should be understood as a set of devices, generally electronic, in charge of managing, ordering, and/or regulating the behavior of another system to which it is connected. The above in order to reduce the probability of failure and to obtain the desired results.

The type of said control system (19) does not limit the scope of the present invention. In a preferred embodiment, and without limiting the scope of protection, the control system (19) is of the SCADA type, which stands for Supervisory Control And Data Acquisition, consisting of PLC's (programmable Logic Control), measuring instruments of all types with their corresponding wiring, all controlled by ad-hoc software.

The control system (19) is operatively connected to: said pair of pneumatic cylinders (14a, 14b), said oil storage tank (14c), said air storage tank (15), said turbine (16), said electric generator (17) and said electric substation (18), wherein said control system (19) is configured to monitor and control each of the aforementioned. Additionally, the control system (19) is configured to control the movement of the movable base (141) of the pair of pneumatic cylinders (14a, 14b), actuating an oil pump (14d).

In another preferred embodiment, and without limiting the scope of protection, said control system (19) additionally comprises a plurality of sensors and valves connected along the entire system (1).

In another preferred embodiment, and without limiting the scope of protection, said control system (19) is satellite-connected to a second floating element (11b) positioned on the waves, as shown in FIG. 1. The control system (19) processes the information coming from said second floating element (11b) positioned on the waves. The distance at which said second floating element (11b) is positioned does not limit the scope of the present invention. In a preferred embodiment, and without limiting the scope of protection, said second floating element (11b) is positioned 1 or 2 kilometers offshore. The connection between said second floating element (11b) and said control system (19) also does not limit the scope of the present invention. In a preferred embodiment, and without limiting the scope of the protection, said second floating element (11b) and said control system (19) communicate by satellite, as shown schematically in FIG. 1. Said second floating element (11b) informs the period and height of the waves, the tidal conditions, in general all the information necessary to regulate the operation of the system, so as to obtain the maximum pressure in the pneumatic cylinders (14a, 14b).

Additionally, the control system (19) will allow that at all times the flow of compressed air that is directed from the air storage tank (15) towards the turbine (16) by hydro-pneumatic thrust is the one required according to the projected energy, according to waves conditions. This is achieved by means of the various regulating valves, pressure, flow, temperature and energy sensors arranged throughout the system operation (1). All the information provided by these elements is communicated to the control system (19), which is processed and from this the essential parameters are defined for the correct operation of the system (1) according to the requirements depending on the environmental and maritime conditions.

The invention claimed is:

1. A system (1) for continuous generation of renewable energy by harnessing ocean waves, comprising:
    a first floating element (11a) positioned on the waves and operatively connected to a vertical assembly (12), wherein the first floating element (11a) is positioned on the waves through a conveyance channel to prevent wave breaking over the first floating element (11a) and the vertical assembly (12);
    a swing arm (13) positioned on a fixed base (131) and operatively connected at one end to said vertical assembly (12), and at an opposite end to a pair of pneumatic cylinders (14a, 14b), wherein movement of said swing arm (13) alternately actuates each of the pneumatic cylinders (14) comprising said pair of pneumatic cylinders (14a, 14b);
    an air storage tank (15) operatively connected to said pair of pneumatic cylinders (14a, 14b);
    a turbine (16) which is fed from said air storage tank (15), and which is operatively connected through a shaft (161) to an electric generator (17);
    an electrical substation (18) operatively connected to said electrical generator (17), wherein said electrical substation (18) is configured to store, manage and distribute the energy produced in said electrical generator (17); and a control system (19) operatively connected to: said pair of pneumatic cylinders (14a, 14b), said air storage tank (15), said turbine (16), said electrical generator (17) and said electrical substation (18), wherein said control system (19) is configured to monitor and control each of the aforementioned.

2. The system (1) according to claim 1, wherein said first floating element (11a) is a buoy.

3. The system (1) according to claim 1, wherein said vertical assembly (12) allows only upward and downward movement of said floating element (11a).

4. The system (1) according to claim 1, wherein said swing arm (13) is anchored to ground through a fixed base (131) and is pivotally connected thereto.

5. The system (1) according to claim 1, wherein each of the pneumatic cylinders (14) comprising said pair of pneumatic cylinders (14a, 14b) comprises a movable base (141).

6. The system (1) according to claim 1, wherein said pair of pneumatic cylinders (14a, 14b) and said air storage tank (15) are connected by means of an oleo-hydraulic system, comprising an oil pump (14d) connected through a pipe to the pneumatic cylinders (14a and 14b) on one side and to an oil regulation tank (14c) on an other side.

7. The system (1) according to claim 1, wherein said air storage tank (15) comprises air regulation means.

8. The system (1) according to claim 1, wherein said turbine (16) is actuated by aerodynamic thrust.

9. The system (1) according to claim 1, wherein said turbine (16) comprises a series of semi-closed blades comprising a rotor (162).

10. The system (1) according to claim 9, wherein said series of semi-closed blades are shaped like an upward spiral forming an inverted cone.

11. The system (1) according to claim 1, wherein said turbine (16) comprises a series of spoon-shaped blades connected to a rotor (162).

12. The system (1) according to claim 1, wherein said turbine (16) is immersed in a fluid reservoir (163) which contains fluid.

13. The system (1) according to claim 1, wherein the air stored in said air storage tank (15) enters the turbine (16) through an air injection duct (164).

14. The system (1) according to claim 13, wherein said air injection duct (164) comprises air injection means (165) positioned in a lower portion of said turbine (16).

15. The system (1) according to claim 14, wherein said air injection means (165) are positioned opposite a rotor (162).

16. The system (1) according to claim 1, wherein said control system (19) additionally comprises a plurality of sensors and valves connected throughout the system (1).

17. The system (1) according to claim 1, wherein said control system (19) is satellite-connected to a second floating element (11b) positioned on the waves.

\* \* \* \* \*